United States Patent
Puthenpura et al.

(10) Patent No.: US 10,098,006 B2
(45) Date of Patent: *Oct. 9, 2018

(54) METHOD AND APPARATUS FOR PLANNING BASE STATION CONTROLLERS IN A WIRELESS NETWORK

(71) Applicant: AT&T Intellectual Property I, L.P., Atlanta, GA (US)

(72) Inventors: Sarat Puthenpura, Berkeley Heights, NJ (US); David G. Belanger, Hillsborough, NJ (US); Arun Jotshi, Parsippany, NJ (US); Sam Houston Parker, Cranbury, NJ (US); Wenjie Zhao, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 52 days.

This patent is subject to a terminal disclaimer.

(21) Appl. No.: 15/207,273

(22) Filed: Jul. 11, 2016

(65) Prior Publication Data

US 2016/0360424 A1 Dec. 8, 2016

Related U.S. Application Data

(63) Continuation of application No. 14/171,303, filed on Feb. 3, 2014, now Pat. No. 9,392,467, which is a continuation of application No. 12/957,786, filed on Dec. 1, 2010, now Pat. No. 8,644,191.

(51) Int. Cl.
| | | |
|---|---|---|
| *H04W 16/18* | (2009.01) | |
| *H04W 28/02* | (2009.01) | |
| *H04W 88/12* | (2009.01) | |

(52) U.S. Cl.
CPC ....... *H04W 16/18* (2013.01); *H04W 28/0289* (2013.01); *H04W 88/12* (2013.01)

(58) Field of Classification Search
CPC .................................................. H04W 16/18
See application file for complete search history.

(56) References Cited

U.S. PATENT DOCUMENTS

| | | | |
|---|---|---|---|
| 6,738,625 | B1 | 5/2004 | Oom et al. |
| 8,644,191 | B2 | 2/2014 | Puthenpura et al. |
| 2010/0017247 | A1 | 1/2010 | Liu et al. |
| 2011/0047011 | A1 | 2/2011 | Tirpak |
| 2012/0134294 | A1 | 5/2012 | Puthenpura et al. |

*Primary Examiner* — Derrick Ferris
*Assistant Examiner* — Kevin Lee

(57) ABSTRACT

A method and apparatus for providing planning of a plurality of base station controllers in a wireless network are disclosed. For example, the method obtains input data, and determines a limit for at least one base station controller parameter in accordance with the input data. The method determines if the limit for the at least one base station controller parameter is exceeded and determines an optimal output for an objective function, wherein the objective function is based on a plurality of penalty factors, if the limit for the at least one base station controller parameter is exceeded.

20 Claims, 4 Drawing Sheets

METHOD AND APPARATUS FOR PLANNING BASE STATION CONTROLLERS IN A WIRELESS NETWORK

This application is a continuation of U.S. patent application Ser. No. 14/171,303, filed Feb. 3, 2014, now U.S. Pat. No. 9,392,467, which is a continuation of U.S. patent application Ser. No. 12/957,786, filed Dec. 1, 2010, now U.S. Pat. No. 8,644,191 and is herein incorporated by reference in its entirety.

The present disclosure relates generally to communication networks and, more particularly, to a method and apparatus for planning base station controllers in a wireless network, e.g., a cellular network.

BACKGROUND

As Internet usage continues to grow, more and more customers are accessing communications services via a mobile device, e.g., a cell phone, a smart phone, etc. For example, a customer may receive multimedia content via his/her cell phone. The cell phone transmits and receives voice and data packets to and from the service provider's network via a base station and an access network.

The customer's ability to access services via a mobile device is dependent on the availability of capacity on various network elements, e.g., base station subsystems, cell site equipment, and so on. The service provider then needs to perform capacity planning and manage the performance of the network. However, capacity planning requires consideration of many factors such as load balancing, capital cost, etc. One approach for planning capacity is manually manipulating parameters associated with each relevant factor until an experienced planner deems the result satisfactory. Unfortunately, this manual approach is labor intensive and highly non-optimal for capacity planning of large networks.

SUMMARY OF THE DISCLOSURE

In one embodiment, the present disclosure describes a method and apparatus for providing planning of a plurality of base station controllers in a wireless network. For example, the method obtains input data, and determines a limit for at least one base station controller parameter in accordance with the input data. The method determines if the limit for the at least one base station controller parameter is exceeded and determines an optimal output for an objective function, wherein the objective function is based on a plurality of penalty factors, if the limit for the at least one base station controller parameter is exceeded.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method and apparatus for planning base station controllers in a wireless network, e.g., a cellular network. Although the teachings of the present disclosure are discussed below in the context of a wireless network, the teaching is not so limited. Namely, the teachings of the present disclosure can be applied for other types of networks, wherein the planning of capacity requires simultaneous consideration of multiple factors.

Figure 1:
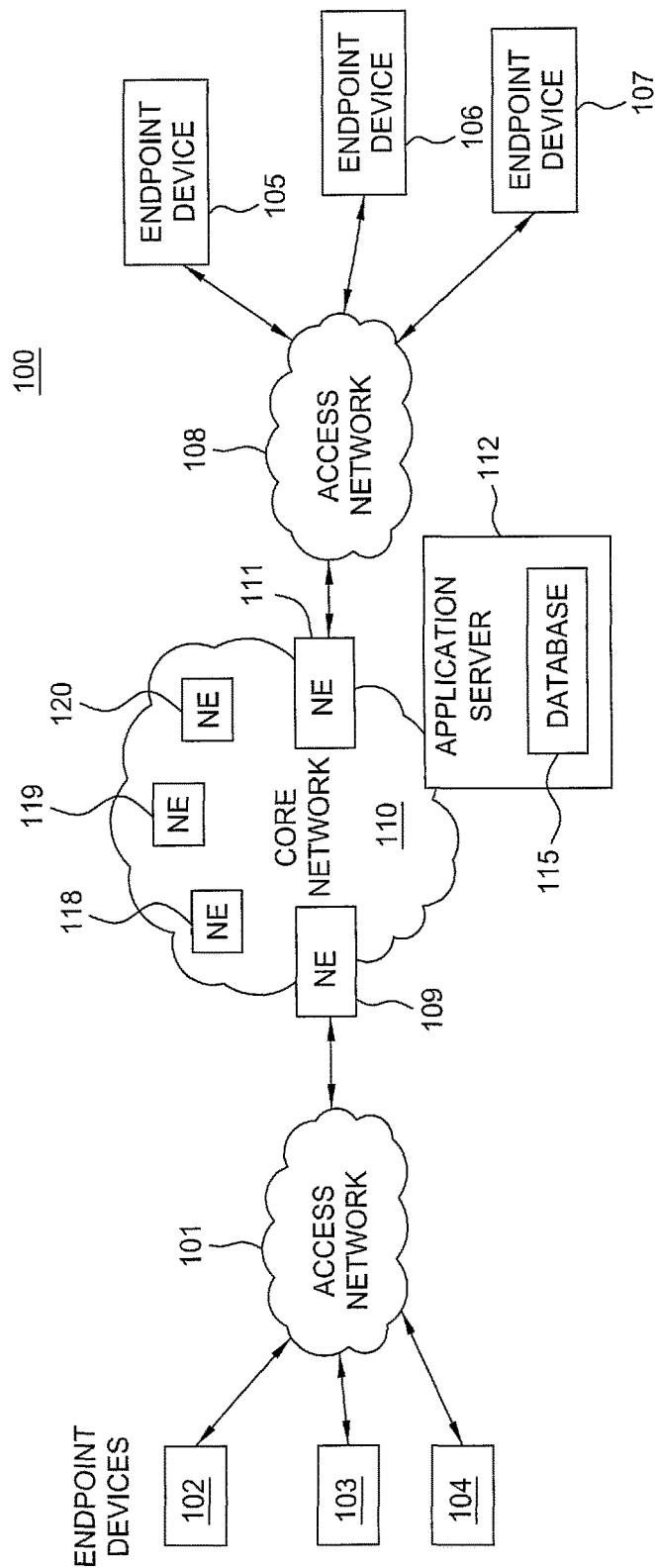
FIG. 1 is a block diagram depicting an illustrative network related to the current disclosure.

FIG. 1 is a block diagram depicting an illustrative network 100 related to the current disclosure. Illustrative networks may include Internet protocol (IP) networks, IP Multimedia Subsystem (IMS) networks, Ethernet networks, wireless networks and the like.

In one embodiment, the network may comprise a plurality of endpoint devices 102-104 configured for communication with the core network 110 (e.g., an IP based core backbone network supported by a service provider) via an access network 101. Similarly, a plurality of endpoint devices 105-107 are configured for communication with the core network 110 via an access network 108. The network elements 109 and 111 may serve as gateway servers or edge routers for the network 110.

The endpoint devices 102-107 may comprise customer endpoint devices such as personal computers, laptop computers, servers, routers, wireless phones, and the like. The access networks 101 and 108 serve as a means to establish a connection between the endpoint devices 102-107 and the NEs 109 and 111 of the core network 110. The access networks 101 and 108 may each comprise a Digital Subscriber Line (DSL) network, a broadband cable access network, a Local Area Network (LAN), a Wireless Access Network (WAN), a Radio Access Network (RAN), a Base Station Subsystem (BSS), a $3^{rd}$ party network, a cellular network, and the like. The access networks 101 and 108 may be either directly connected to NEs 109 and 111 of the core network 110, or indirectly through another network.

Some NEs (e.g., NEs 109 and 111) reside at the edge of the core infrastructure and interface with customer endpoints over various types of access networks. An NE that resides at the edge of a core infrastructure can be implemented as an edge router, a media gateway, a border element, a firewall, a switch, and the like. An NE may also reside within the network (e.g., NEs 118-120) and may be used as a mail server, a router, or like device. The core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements and so on are depicted in FIG. 1, the communication system 100 may be expanded by including additional endpoint devices, access networks, network elements, and/or application servers, without altering the teachings of the present disclosure. The above network 100 is described to provide an illustrative environment in which data for various services, e.g., voice and data services, are transmitted on networks.

In one embodiment, a service provider may enable customers to access services via a wireless access network, e.g., a base station subsystem. For example, a customer may use a cell phone or a smart phone to access Internet Protocol (IP) services, multimedia services, and the like. The packets from and to the wireless device, e.g., cell phone, may then traverse one or more base station subsystems and equipment, e.g., base stations, backhaul equipment, etc. A base station for a cellular network is also referred to as a base transceiver station.

In one embodiment, a base transceiver station for a wireless network may be deployed with one or more directional antennas that cover a predetermined portion of the 360 degree angle. The coverage of one directional antenna is determined by dividing the 360 degrees by the number of directional antennas included in the base station. A portion of a wireless network that is covered with one directional antenna is referred to as a sector. For example, if there are three directional antennas at a base station, each directional antenna covers 120 degrees, thereby resulting in three sectors. The exemplary base station may also be referred to as a three sector base station.

In one embodiment, each sector uses a predetermined portion of available frequency resources such that adjacent sectors may assign channels in mutually exclusive frequency ranges. However, it should be noted that other cellular networks may assign frequency ranges in a different manner and the present disclosure is not limited in this aspect. For example, each of the three sectors above may use one third of available frequency resources. Adjacent sectors use different frequency ranges. The channels for adjacent sectors are then assigned in mutually exclusive frequency ranges such that interference is minimized.

In one embodiment, each base station (also known as base transceiver station) in a wireless network is controlled by a base station controller (BSC). However, the wireless network may have a plurality of base station controllers. For example, the wireless network may comprise a plurality of base station subsystems. Each of the base station subsystems may comprise a plurality of base station controllers. For each base transceiver station, a specific base station controller is then selected from among the plurality of base station controllers. The assigning of a base transceiver station to a specific base station controller may also be referred to as homing. For example, a specific base transceiver station "A" may be homed to a specific base station controller "X." The specific base station controller X is then responsible for controlling the traffic traversing through the base transceiver station A. For example, the base station controller X may be allocating radio channels, receiving measurements from the end user devices (e.g., cell phones or smart phones), controlling hand-over among a plurality of base transceiver stations, etc. If at a later time period, another base station controller Y is selected to control the traffic traversing through the base transceiver station A, the base transceiver station A is said to be re-homed to the base station controller Y.

In order to describe a typical user interaction with the base station controller and base transceiver stations, suppose a user initiates a call via the base transceiver station A which is controlled by the base station controller X. Suppose the user then moves from one cell site to another cell site necessitating a hand over from the base transceiver station A to a second base transceiver station B. If the call is being handed over to a base transceiver station in another base station controller's territory (e.g., base station controller Y controlling base station B), the base station controller X needs to hand over the call to the base station controller Y. This example illustrates that if the first and the second base transceiver stations are not controlled by the same base station controller, then the call may need to be handed over to another base station controller. The handover from one base station controller to another base station controller requires extra signaling, and may incur delay. For example, a hand-over from one base station controller to another base station controller may be, at least in part, a responsibility of a mobile switching center. The relative merit of load balancing among a plurality of base station controllers against the resulting increase in handover traffic may then need to be evaluated. Therefore, a method for providing capacity planning for base station controllers that takes into account various factors, e.g., penalty factors, will be beneficial to service providers of cellular networks.

In one embodiment, the current method performs the planning of the deployment of base station controllers in accordance with several factors, e.g., the need to provide load balancing among the existing base station controllers, the need to minimize the handover of traffic across base station controller boundaries, the need to minimize capital cost of deploying new base station controllers, the need to minimize base transceiver station re-homing, the need to minimize the number of base station controllers assigned to base transceiver station groups, the need to minimize cost of backhauling (base station subsystem transport cost), the need to automatically incorporate key base station controller parameters computed based on actual observations, the need to account for network performance data, the need to account for user behavior data, and the like.

As illustrated by the above example, the penalties (broadly advantages and disadvantage) associated with load-balancing and handover minimization need to be carefully weighed against each other. Moreover, user considerations (e.g., user behavior data) may affect the relative weighting between load balancing and handover minimization. For example, a group of base transceiver stations may be intentionally grouped together and will be better served by the same base station controller. For example, if most calls are among users communicating via a specific set of base transceiver stations, then keeping the set of base transceiver stations under control of the same base station controller should be beneficial. However, in another example, load balancing may be more important than keeping the group of base transceiver stations under the control of the same base station controller, i.e., the traffic load can be divided among a plurality of base station controllers.

In one embodiment, the number of base station controllers assigned to the base transceiver station groups may be defined based on geographical clustering. For example, proximity to large sports and cultural venues may benefit from an increase in the connectivity among a plurality of base transceiver stations. In one embodiment, various base station controller parameters computed based on actual observations may be used in market specific call models for future base station controller capacity planning.

In one embodiment, there may be constraints placed on homing requirements of the base transceiver stations. For example, certain base transceiver stations may be required to be controlled by a given base station controller, certain base transceiver stations may be required not to be controlled by a given base station controller, certain groups of base transceiver stations may be required to be controlled by the same base station controller, and so on.

In one embodiment, user behavior data and preference data are used to capture the dynamic nature of user applications. For example, new applications may impose different constraints in terms of the amount of traffic the base station controller needs to handle. For example, a new application may impose a higher throughput requirement as opposed to an older application. For example, an application that transmits image data (e.g., medical images, pictures, etc.) will likely impose a higher throughput than an application for supporting voice only conversations.

In one embodiment, base station controllers that control base transceiver stations at different physical locations may have different requirements. For example, a base station controller that controls base transceiver stations in a large metropolitan area, in a sports venue, etc. may have a different requirement as compared to a base station controller controlling base transceiver stations in a less densely populated area.

In one embodiment, the call models for calls traversing the base transceiver stations may change over time. For example, a call model may change based on season of the year, day of the week, time of day, introduction of new user device types, introduction of new applications, etc. Since the call models are dynamic, the performance of the base station controllers needs to be assessed based on the changing call models. For example, a base station controller may be adequate to control a large number of base transceiver stations near a sports venue when the venue has limited use. However, when the venue is fully utilized, additional base station controllers may be needed. Thus, the call models and user behavior will affect the performance of the base station controllers in the network throughout the life of the base station controllers.

In one embodiment, the current method gathers network performance data to evaluate how well the base station controllers are meeting the various requirements. For example, a base station controller's performance may be measured in terms of how many Erlangs the base station controller can handle, the bi-directional throughput values, the base station controller's capacity limit, etc. The performance data for each base station controller is then obtained and analyzed to evaluate key performance parameters. The result of the analysis may then be used for base station controller planning.

In one embodiment, the base station controller planning may be used to provide efficient boundary for base transceiver station homing, re-homing, or a combination of homing and re-homing. For example, the method may provide a base station controller plan, for each forecasting period, such that all business, cost and engineering constraints are met. Thus, one goal is then to minimize the overall penalty factors. In one example, base transceiver stations in a 2G network (e.g., referred to as BTS) may be re-homed based on a computation of capacity planning. In one example, the planning may be used to determine an optimal upgrade or deployment schedule for new and/or existing base station controllers.

In order to provide the planning of the base station controllers while considering all of the above penalty factors, the current method first defines an objective function that is based on one or more of the penalty factors described above.

In one embodiment, the objective function is defined based on the following penalty factors: geographical clustering, handover traffic, load balancing, base transceiver station re-homing and budgetary limitations (e.g., cost of a base station controller). In one embodiment, the objective function is expressed as:

$$\sum_{NEWBSC} Y[NEWBSC, t] * (CapEx[NEWBSC, t] +$$

Equation (1)

$$OpEx[NEWBSC, t] + Monthly[NEWBSC, t]) +$$

-continued $$\sum_{j \in ALLBSC} PenaltyofDist * \left( \sum_{BTS} X[i, j, t] * Distance[i, j] \right) +$$

$$\sum_{j \in ALLBSC} IuR\_Bandwidth[j, t] * PenaltyofHO *$$

$$slider\_scale + \sum_{j \in ALLBSC} PenaltyofLB *$$

$$\left( \left( \sum_{BTS} X[i, j, t] * CPU[i, t] \right) - AvgCPULoad \right)^2 +$$

$$\sum_{j \in ALLBSC} \sum_{BTS \in BSC} \{If(X[i, j, t] - X[i, j, t-1] \neq 0) \text{ then}$$

$$1 \text{ Otherwise } 0\} * PenaltyofRH * slider\_scale$$

For clarity purposes, the various terms used in the above equation (1) are described below. The optimal solution for equation (1) may be found using a linear programming method. For example, a linear programming solver may be used. The decisions associated with the optimal solution take only integer values. For example, the decisions may involve one or more of: how many new base station controllers are needed, which one of the base station controllers should be used to connect to each base transceiver station, etc. Hence, the problem may be defined as a mixed integer programming problem. For ease of understanding, a first decision variable to represent a connection between a base transceiver station (BTS) and a base station controller (BSC), and a second decision variable to indicate if a new BSC should be added are first defined.

The first decision variable is Variable X[BTS,BSC,t], which is defined as a set of binary variables X that represent the connection between BTS and BSC in time period t, wherein $$X[BTS, BSC, t] = \begin{cases} 1, & \text{If } BTS \text{ connects to the } BSC \text{ (existing or new)} \\ & \text{in time period } t \\ 0, & \text{Otherwise} \end{cases}.$$

The variables X are defined over all possible connection combinations between BTS and BSC in time period t. For example, for a specific BTS, there is a group of n BSCs to which the BTS can be connected. Accordingly, a group of variables X[BTS, BSC1, t], X[BTS, BSC2, t], . . . , X[BTS, BSCn, t] are defined. It is important to note that one and only one variable X in this group must have a value of one (implying a connection to the specific BSC), the rest of the variables X have a value of zero (implying no connection to the specific BSC).

In order to ensure that a base transceiver station is connected only to one BSC, the current method utilized an additional constraint:

$$\sum_{BSC \in Market} X[BTS, BSC, t] = 1, \forall BTS.$$

The second variable is Variable Y[NEWBSC, t], which is defined as a set of binary variables Y that represent if a new BSC is to be added in time period t, wherein $$Y[NEWBSC, t] = \begin{cases} 1, & \text{if } NEWBSC \text{ is added in time period } t \\ 0, & \text{Otherwise} \end{cases}$$

The variables Y are defined over all possible new BSC locations. In order to ensure that no base transceiver station is connected to the new BSC unless the new BSC is added to the market, the current method adds the following logical constraint:

$$\Sigma_{BTS}X[BTS,NEWBSC,t] \le Y[NEWBSC,t]* BigM, \forall NEWBSC.$$

wherein, the BigM represents a large number, e.g., 10,000. If Y[NEWBSC,t]=0, the inequality forces the summation at the left hand side to be equal to zero. This implies that no BTS can be connected to the new BSC if the BSC is not added to the market.

Then, the method defines terms that serve as weight factors for differentiating the relative importance of a particular penalty factor as compared to other penalty factors in the objective function. Each penalty factor then has a weight factor that differentiates the relative importance of the penalty factor as compared to other penalty factors. In one example, the penalty for re-homing may be more important than the penalty for meeting budget targets. In another example, the penalty associated with load balancing may be more important. The current method defines PenaltyofHO, PenaltyofLB, PenaltyofRH, and PenaltyofDist to act as weights to corresponding terms in the overall objective function. PenaltyofHO is a weight for relative importance of handover penalty, PenaltyofLB is a weight for relative importance of load balancing, PenaltyofRH is a weight for relative importance of re-homing and PenaltyofDist is a weight for relative importance of geographical clustering.

In one embodiment, a user may modify the weight factor associated with a penalty factor. For example, the weight factor associated with a penalty factor can be modified using a slider scale with values from "zero" to "one". For example, moving a slider scale for PenaltyofLB towards "one" gives more importance to load balancing as compared to other penalties. In one embodiment, a default value of 0.5 is assigned to a slider scale associated with any one of the above penalties.

Returning to Equ. 1, a new base station controller (BSC) is deployed if the new BSC meets budgetary limitations. The current method incorporates the penalty associated with budgetary limitations in the objective function via the term:

$$\sum_{NEWBSC \in Market} Y[NEWBSC, t]*$$

$$(CapEx[NEWBSC, t] + OpEx[NEWBSC, t] + MonthOpEx[NEWBSC, t])$$

The objective function accounts for penalty associated with handover via the terms:

$$\sum_{BSC \in Market} IuR_{Bandwidth[BSC,t]} * PenaltyofHO \text{ and } IuR\_Bandwidth[BSC, t] =$$

$$\sum_{BTSi}\sum_{BTSj}\{If((X[BTSi, BSC, t] = 1 \text{ and } X[BTSj, BSC, t] = 0)$$

$$\text{or } (X[BTSi, BSC, t] = 0 \text{ and } X[BTSj, BSC, t] = 1))$$

$$\text{then HO\_Traffic}[BTSi, BTSj, t], \text{Otherwise } 0\}$$

The penalty of handover, PenaltyofHO, is the penalty for one unit of handover traffic, and IuR_Bandwidth[BSC, t] is the total handover traffic at a given BSC. The formula realizes the logic that if the base transceiver stations i and j (BTSi and BTSj) are connected to different BSCs, a penalty HOTraffic [BTSi, BTSj, t]*PenaltyofHO, is added; otherwise, there is no handover penalty. For example, a linear programming solver may be used to solve the objective function while forcing the total handover traffic to be as low as possible.

The objective function includes the penalty associated with load balancing via the term:

$$\sum_{BSC \in Market} PenaltyofLB*$$

$$\left(\left(\sum_{BTS} X[BTS, BSC, t] * CPU[NBTS, t]\right) - AvgCPULoad\right)^2 \text{ wherein,}$$

$$AvgCPULoad = \frac{\sum_{BTS} CPU[BTS, t]}{NumberofBSC}$$

As the equation indicates, the load balancing is based on a control plane central processing unit (CPU) utilization. The objective is defined such that: the total of the differences between the traffic loading at each BSC and the average load is as small as possible. Since the objective function is solved while minimizing $((\Sigma_{BTS \in BSC}X[BTS, BSC, t]*CPU[BTS, t])-AvgCPULoad)^2$, the loading on an BSC, $\Sigma_{BTS}X[BTS, BSC, t]*CPU[BTS, t]$, becomes as close as possible to the average CPU loading.

The objective function includes the penalty associated with re-homing via the term:

$$\sum_{BSC \in Market} PenaltyofRH*$$

$$\left(\sum_{BTS \in BSC}\{If(X[BTS, BSC, t] - X[BTS, BSC, t-1] \ne 0)\right.$$

$$\left. \text{then 1 Otherwise 0}\}\right)$$

The penalty associated with re-homing refers to a penalty term for re-homing a base transceiver station from one BSC to a different BSC. As described above, X[BTS, BSC, t] is the decision variable of connection between a BTS and a BSC in the current time period, and X[BTS, BSC, t−1] is the decision variable between the same pair of BTS and BSC but in the previous time period. Thus, the formula enforces the logic that if a BTS in the current time period connects to the same BSC that it was connected to in the previous time period, then there is no re-homing penalty. Otherwise, a re-homing penalty is applied. Including the re-homing penalty in the objective function has the effect of keeping the number of re-homings as small as possible.

The objective function includes the penalty associated with connecting a base transceiver station to a BSC which is not geographically the closest to the base transceiver station via the term:

$$\sum_{BSC \in Market} PenaltyofDist * \left( \sum_{BTS} X[BTS, BSC, t] * Distance[BTS, BSC, t] \right)$$

The distance between a BTS and the location of a BSC is represented by Distance[BTS, BSC, t]. The location of the BSC is defined as the centroid of a BSC based on the latitude and longitude of the BTSs that are connected to the BSC. Including the penalty for connecting to a BSC that is not geographically the closest has the effect of clustering the BTSs (base transceiver stations) to their closest BSC, in terms of geographical location.

The objective function of equation (1), needs to be solved subject to business, cost and engineering constraints. For example, a base station controller may have a limit on the number sectors it can connect to. In another example, the number of total T1 ports on a base station controller is limited to a given value. The capacity of each base station controller is clearly bounded, and so on.

In one embodiment, the equation (1) is solved via a linear programming solver by: adding a necessary number of new BSCs; evaluating all possibilities of base transceiver station assignments to the BSCs (new and existing); and achieving an optimal solution. The optimal solution satisfies all business, cost and engineering constraints, while minimizing the objective function defined by equation (1).

The current method includes the engineering, cost and business constraints by first classifying the constraints into one or more of the following categories: user traffic constraints, interface port constraints or control plane constraints. The user traffic constraints, interface port constraints and control plane constraints are related to one or more constraints of the base station controller parameters. In order to simplify the description of the base station control parameters related to each of the user traffic, interface port and control plane constraints, the following network terminologies are first provided:

General packet radio service (GPRS);
Serving GPRS support node (SGSN);
Gateway GPRS support node (GGSN);
Mobile Switching Center (MSC);
Gateway mobile switching center (GMSC);
Enhanced Data rates for GSM Evolution (EDGE);
Gb interface;
A-bis interface;
Ater interface;
IuR-G interface; and
A-interface.

General packet radio service (GPRS) refers to a communications service used to transfer data via a cellular network. GPRS is available to users of a 2G cellular system GSM (global system for mobile communication). The GPRS provides an enhancement to the GSM system so that data packets are supported.

A Serving GPRS Support Node (SGSN) refers to a network node responsible for communicating with user endpoint devices and routing of data calls. For example, the SGSN may send and receive data packets to and from user endpoint devices in the coverage area of the SGSN.

A Gateway GPRS Support Node (GGSN) refers to a network node responsible for the interworking between the GPRS network and external packet switched networks, e.g., the internet. The GGSN converts the GPRS packets coming from the SGSN into the packet data protocol (PDP) format of the external packet network. For example, the GPRS packet may be converted to an internet protocol packet prior to being sent to the external network, which is internet protocol based.

A Mobile Switching Center (MSC) refers to a network node that is responsible for communicating with user endpoint devices and routing voice calls. For example, the MSC may setup and release end-to-end connections and perform handover during a call to handle mobility of user endpoint devices.

A Gateway mobile switching center (GMSC) refers to a network node that determines which mobile switching center (MSC) is currently being visited by a called party.

An Enhanced Data rates for GSM Evolution (EDGE) refers to an extension (upgrade) to GSM that enables backward-compatibility and provides improved data transmission rates.

A Gb interface refers to an interface between a base station subsystem and an SGSN. The transmission protocol of the Gb interface may be based on a packet protocol, e.g., an internet protocol or a frame relay protocol.

An IuR-G interface refers to an interface between two base station controllers.

An A-bis interface refers to an interface between the BTS and BSC. The A-bis interface may be carried on a Time Division Multiplexing (TDM) based circuit. For example, the TDM circuit may be a DS-1 (digital signal 1), an E1 (European line rate 1) circuit, etc.

An Ater interface refers to an interface between the BSC and a transcoder. The transcoder may be a separate device located between the BSC and MSC, or may be integrated into either the BSC or the MSC. Ater interface also carries the A-interface (A interface described below) information from the BSC to the MSC without processing or modifying the information. For example, a transcoder processes the voice information while allowing the SS7 signaling information to pass through untouched such that the signaling is processed by the BSC and the MSC.

An A-interface refers to an interface between the BSC and the MSC. It is used for carrying voice traffic channels.

In one embodiment, the current method relates the user traffic constraints to the constraints of the BSC parameters: sector count, Erlang, TRX count (transceiver count), TCH (TDM sub-channel for traffic) count, busy hour data (e.g., in Mbps), and busy hour call attempts (BHCA).

In one embodiment, the constraint on a sector count parameter is defined as:

$$\sum_{BTS} X[BTS, BSC, t] * SectorCount[BTS, t] \leq$$

$$SectorCountCapacity[BSC, t] * SectorCountEngrLimit.$$

In one embodiment, the constraint on a busy hour call attempt (BHCA) parameter is defined as:

$$\sum_{BTS} X[BTS, BSC, t] * BHCA[BTS, t] \leq BHCACapacity[BSC, t].$$

In one embodiment, the current method relates the control plane constraints to the constraints of the BSC parameters used for management of resources and mobility. In one embodiment, the parameters may have values calculated differently for different vendor products. For example, the parameter may be based on a number of dedicated GPRS channels, a number of on-demand GPRS channels, a number of EDGE channels, etc. In one example, the control plane constraints are related to a constraint of the BSC parameter Site_CH[BTS, t], which may be based on the number of dedicated GPRS channels, on-demand GPRS channels, EDGE channels, etc. For example, the constraint of the BSC parameter may be defined as:

$$\sum_{BTS} X[BTS, BSC, t] * \text{Site\_CH}[BTS, t] \leq$$
$$\text{Capacity}[BSC, t] * ENGINEERINGLIMIT$$

In one embodiment, the current method relates the interface port constraints to the constraints of the BSC parameters:
A-bis link constraints;
A-interface constraints;
Gb interface constraints;
IuR-G interface constraints;
Transcoder channel demand constraints;
PDCH (packet data channel) constraints
T1/E1 port constraints (total T1/E1 port constraints); and
Signaling system 7 (SS7) link demand constraints.
In one embodiment, the constraint on the BSC parameter T1 port constraint is defined as:

$$\sum_{BTS} X[BTS, BSC, t] * \text{Abis\_T1}[BTS, t] +$$
$$\text{Ater\_T1}[BTS, t] + \text{A\_T1}[BTS, t] + \text{Gb\_T1}[BTS, t] \leq$$
$$T1 \text{ Port Capacity } [BSC, t] * T1 \text{ ENGINEERING LIMIT}$$

In one embodiment, the constraint on the BSC parameter transcoder channel demand constraint is defined as:

$$\sum_{BTS} X[BTS, BSC, t] * TcuCH[BTS, t] \leq TcuCHCapacity[BSC, t] *$$
$$\text{TRANSCODER CHANNEL ENGINEERING LIMIT}$$

In one embodiment, the constraint on the BSC parameter SS7 link demand constraint is defined as:

$$\sum_{BTS} X[BTS, BSC, t] * \left( \frac{TcuCH[BTS, t]}{C1} \right) \leq$$
$$SS7Capacity[BSC, t] * SS7 \text{ ENGINEERING LIMIT}$$

Wherein, C1 is a constant.

Figure 2:
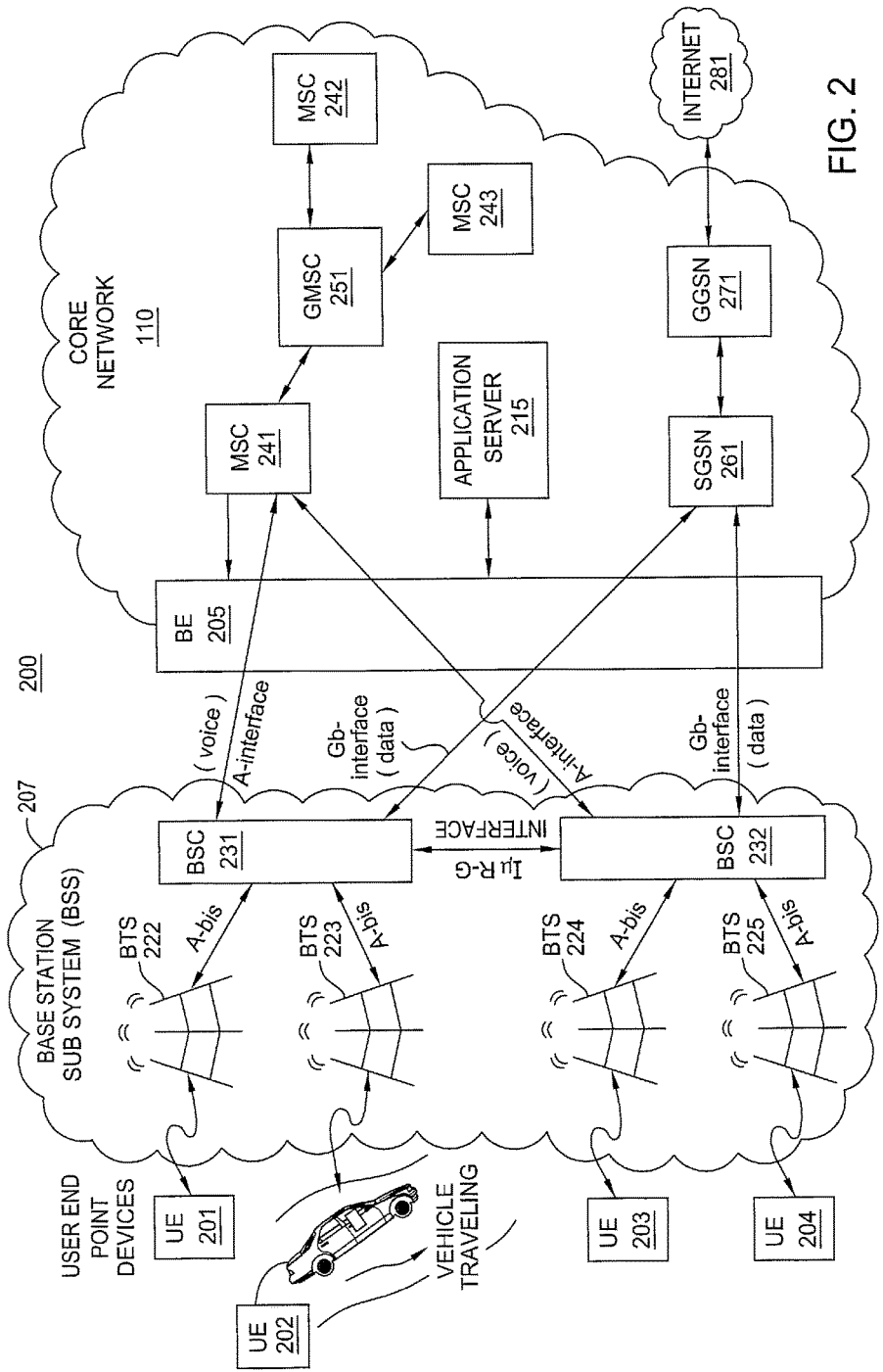
FIG. 2 provides an exemplary network with the current method of planning base station controllers.

FIG. 2 provides an exemplary illustration 200 of a network with the current method of planning base station controllers. For example, the current method for planning base station controllers is implemented in an application server 215 located in the core network 110. Alternatively, the application server 215 can be deployed external to the core network. The end point devices communicate with the core network 110 via base station subsystem 207 and border element (BE) 205.

In one embodiment, the core network 110 comprises mobile switching centers (MSCs) 241-243, a gateway mobile switching center (GMSC) 251, a serving GPRS support node (SGSN) 261, a gateway GPRS support node (GGSN) 271. In one embodiment, the base station subsystem 207 comprises base transceiver stations 222-225 and base station controllers 231 and 232. Each of the base transceiver stations 222 and 223 communicates with the base station controller 231 via an A-bis interface and is controlled by the base station controller 231. Each of the base transceiver stations 224 and 225 communicates with the base station controller 232 via an A-bis interface and is controlled by the base station controller 232. The base transceiver stations 222-225 communicate with one or more user endpoint devices 201-204 via a wireless interface. Communication among the plurality of base station controllers (e.g., BSCs 231 and 232) is performed over an IuR-G interface. The base station controllers 231 and 232 communicate with the MSC 241 via an A-interface for routing voice calls. Similarly, the base station controllers 231 and 232 communicate with the SGSN 261 via a Gb interface to route data calls.

In one embodiment, the MSC 241 is in communication with a GMSC 251. When the GMSC 251 receives a voice call from the MSC 241, the GMSC 251 determines which one of the MSCs 242-243 is being visited by a called party of the received voice call. The voice call is then forwarded to the MSC (one of the MSCs 242-243) being visited by the called party. Similarly, data calls are routed to their destination via the SGSN 261 and GGSN 271. The GGSN 271 is in communication with external networks, e.g., the Internet 281.

In one embodiment, the user of the endpoint device 202 may travel from a geographical area served by the base transceiver station 223 to a geographical area served by the base transceiver station 224. As the user travels to various locations, the base station controller 231 may have to handover an ongoing call to the base station controller 232. It should be noted FIG. 2 only provides simplified views of the base station subsystem. As such, additional base transceiver stations and base station controllers can be deployed without changing the scope of the present disclosure.

In one embodiment, the current method provides planning of base station controllers and their respective boundaries based on one or more of the above factors such that a plurality of base station controllers may function optimally network wide. It should be noted that the present method does not require that all of the above factors be considered. The factors that will be considered will be governed by the requirements of a particular deployment.

In order to provide planning of the base station controllers, the current method calculates values for one or more base station controller parameters. The parameters may be needed for one or more of the penalty factors of the objective function. For example, a parameter may affect one or more of: penalty factor associated with geographical clustering, penalty factor associated with handover traffic, penalty factor associated with load balancing, penalty factor associated with base transceiver station re-homing, and penalty factor associated with budgetary limitations.

In one embodiment, the input data for calculating the values for the one or more base station controller parameters may comprise one or more of:

busy hour demand forecast;
transport cost (backhauling);
base station controller locations;
handover data;
unit cost for new base station controller and the time required to deploy new base station controller;
unit cost for re-homing and time required for re-homing;
unit cost for software upgrade and time required for software upgrade;
user preference to allow or disallow a new base station controller, re-homing of base transceiver stations and/or software upgrade; and
user preference to control quantity and time of new base station controller, re-homing of base transceiver stations and/or software upgrade.

In one embodiment, the method may then analyze the results to determine if limits for any of the one or more base station controller parameters are exceeded. If the limits are exceeded, the method then proceeds to identify an optimal output. In one embodiment, if limits are not reached or exceeded, re-optimizing may be performed to provide an improvement. In one embodiment, if the limits are not reached, the method for the optimization may simply be delayed until new data is gathered.

In one embodiment, the current method provides an optimal output that may comprise: adding one or more new base station controllers, providing load balancing among existing base station controllers, minimizing handover traffic, and performing upgrades on existing base station controllers. The optimal output is derived by finding the optimal solution for the objective function of Equ. 1.

In one embodiment, the current method provides one or more of the following schedules or reports based on the above optimal output:
a time series for base station controller additions;
a time series for base station controller upgrades;
a time series for base transceiver station re-homing and/or load balancing;
a time series for base transceiver station to a base station controller assignment; and
a report for triggering base station subsystem activities.

Figure 3:
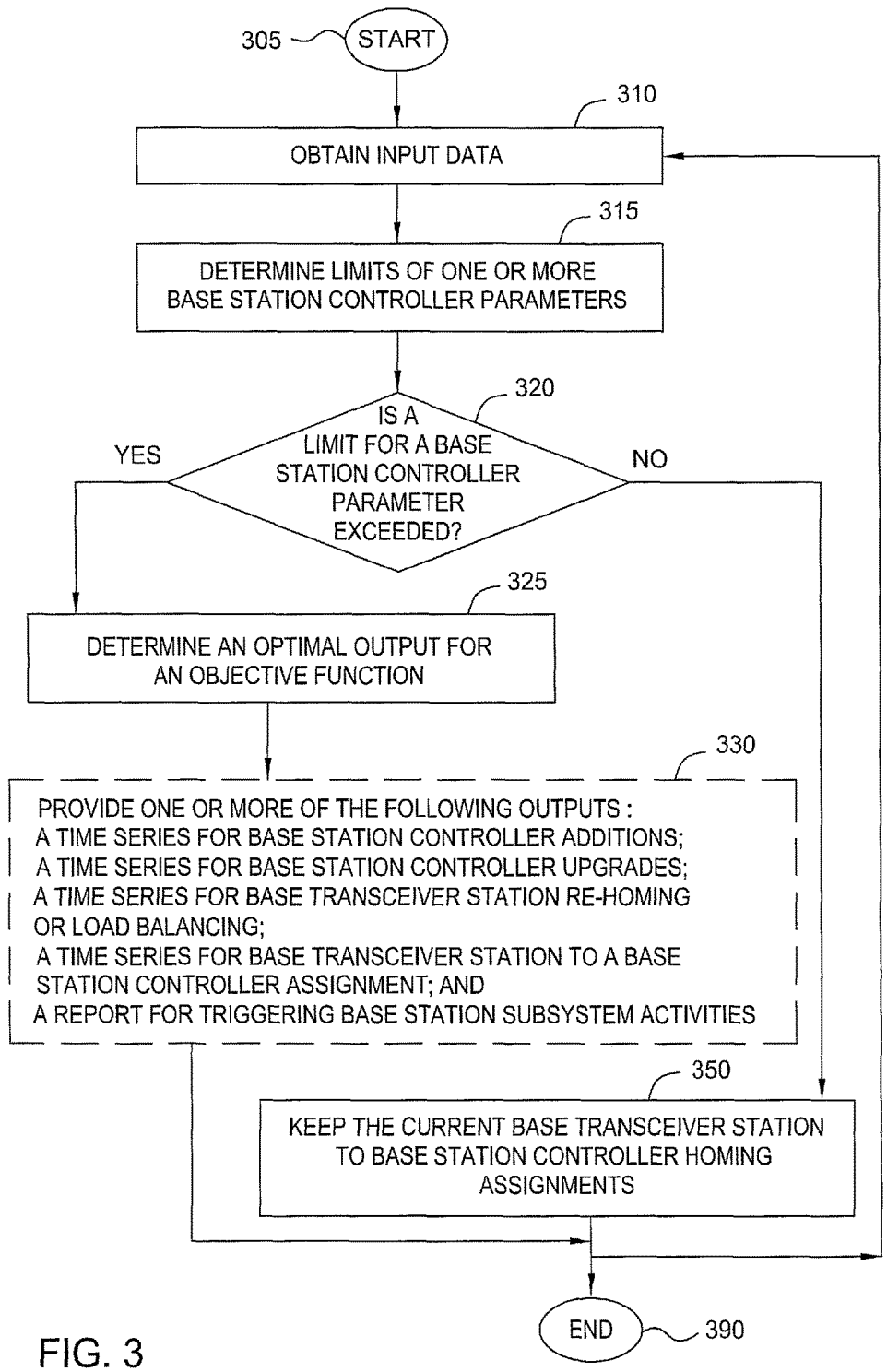
FIG. 3 illustrates a flowchart of the method for planning base station controllers in a wireless network.

FIG. 3 illustrates a flowchart of the method 300 for planning base station controllers in a wireless network, e.g., a 2G cellular network. The method 300 may be implemented in an application server (or a general purpose computer as disclosed in FIG. 4 below) located in the service provider's network. For example, the method is implemented in the application server 215 deployed in the core network 110. Method 300 starts in step 305 and proceeds to step 310.

In step 310, method 300 obtains input data for determining values of one or more base station controller parameters. The input data may comprise one or more of:
busy hour demand forecast;
transport cost (backhauling);
base station controller locations;
handover data;
unit cost for new base station controller and the time required to deploy new base station controller;
unit cost for re-homing and time required for re-homing;
unit cost for software upgrade and time required for software upgrade;
user preference to allow or disallow a new base station controller, re-homing base transceiver stations and/or software upgrade; and
user preference to control quantity and time of new base station controller, re-homing base transceiver stations and/or software upgrade.

In step 315, method 300 determines the values (broadly limits) of the one or more base station controller parameters. For example, the method may determine Erlangs for each base station controller, performance data for each base station controller, backhauling cost for each base station controller, etc.

In optional step 320, method 300 determines if a limit for a base station controller parameter is exceeded. For example, throughput limits, may be reached for one or more base station controller. In another example, the performance of one or more base station controllers may be degraded. In one embodiment, if at least one limit is exceeded, the method proceeds to step 325. However, it should be noted that method 300 can be triggered even if no limit has been exceeded. For example, the method 300 can be triggered manually if there is a need or a desire to perform a re-optimization analysis. Otherwise, the method proceeds to step 350, or alternatively step 325 also to re-optimize the base transceiver station to base station controller connectivity.

In step 325, method 300 determines an optimal output for an objective function, wherein the objective function is based on one or more penalty factors. For example, the objective function may be defined based on one or more of the following penalty factors: geographical clustering, handover traffic, load balancing, base station re-homing and one or more budgetary limitations. The optimal output is then the output that minimizes the penalty over all the penalty factors. That is, the optimal output minimizes the objective function provided in Equ. (1).

In one embodiment, the current method provides an optimal output that may comprise: adding new base station controllers, providing load balancing among existing base station controllers, minimizing handover traffic, and performing upgrades on existing base station controllers. The method then proceeds to an optional step 330.

In optional step 330, method 300 provides one or more of the following outputs based on the above optimal output:
a time series for base station controller additions;
a time series for base station controller upgrades;
a time series for base transceiver station re-homing and/or load balancing;
a time series for base transceiver station to a base station controller assignment; and/or
a report for triggering base station subsystem activities, e.g. one or more reports for triggering base station controller or base transceiver station related activities.

The method then either proceeds to step 390 to end processing the current planning data, or to return to step 310 to receive more input data.

In step 350, method 300 keeps the current base transceiver station to base station controller homing assignments. The method then either proceeds to step 390 to end processing the current planning data, or to return to step 310 to receive more input data.

In one embodiment, the above optimal output is determined by minimizing the objective function provided in Equ. (1), while considering all of the above constraints simultaneously.

In one embodiment, the above optimal output is determined by minimizing the objective function provided in Equ. (1) via a multistep-wise approach. For example, the method may first determine a specific number of base station controllers needed in order to satisfy all the capacity requirements and business rules of a market, and then proceed to determine the optimal solution for the resulting specific number of base station controllers.

For instance, there may be service provider or user preferences that disallow a certain group of base transceiver stations from being homed to a same base station controller. Similarly, other groups of base transceiver stations may be required to be homed to a same base station controller. The first step may then be determining the number of base station controllers, using the capacity requirements and the rules that apply to a specific market. The number of new base station controllers may then be determined by subtracting the number of base station controllers already implemented from the number of base station controllers needed for the specific market. The average loading of the base station controllers may then be determined from the number of base station controllers and the total demand for the specific market. Once the average loading of the base station controllers is known, the method determines the optimal output by minimizing the objection function provided in Equ. (1), while considering penalties associated with load balancing, a number of handover, a number of re-homing, geographical clustering, and all cost, engineering and business constraints. The multistep approach enables the linear programming solver to perform the search for the optimal solution without necessarily having to perform an exhaustive search that calculates the penalty for every possible homing assignment of each base transceiver station to every possible base station controller.

It should be noted that the above multistep-wise approach may comprise any number of steps. For example, the service provider may further limit based on geographical clustering prior to determining the optimal output of Equ. (1). For example, if the service provider is able to eliminate some homing assignments due to geographical clustering, the optimal output may be determined only from among the allowed homing assignments.

It should be noted that although not specifically stated, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
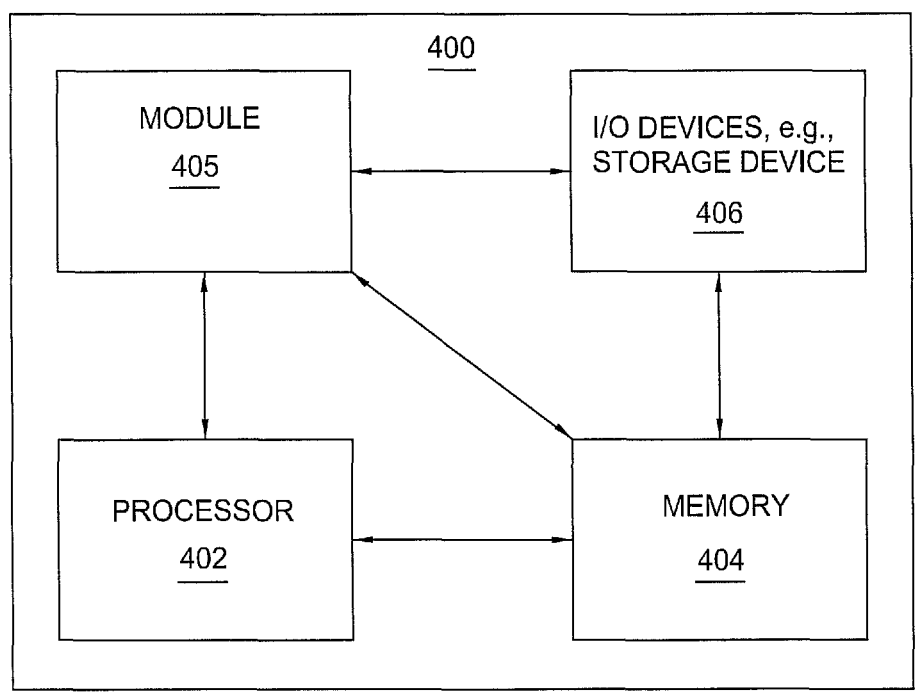
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for planning base station controllers in a wireless network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the teachings of the present disclosure can be implemented in software and hardware, e.g., using application specific integrated circuits (ASIC), a general purpose computer or any other hardware equivalents. In one embodiment, the present module or process 405 for planning base station controllers in a wireless network, can be loaded into memory 404 and executed by processor 402 to implement the functions as discussed above. As such, the present method 405 for planning base station controllers in a wireless network (including associated data structures) of the present disclosure can be stored on a non-transitory (e.g., physical or tangible) computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing planning of a plurality of base station controllers in a wireless network, the method comprising:
    obtaining, via a processor, input data;
    determining, via the processor, a limit for a base station controller parameter in accordance with the input data;
    determining, via the processor, when the limit for the base station controller parameter is exceeded;
    determining after the limit for the base station controller parameter is exceeded, via the processor, an optimal output for an objective function, wherein the objective function is based on a plurality of penalty factors, wherein the plurality of penalty factors comprises a first penalty factor associated with base transceiver station re-homing and a second penalty factor associated with geographical clustering, wherein the first penalty factor is distinct from the second penalty factor; and
    providing, via the processor, a schedule based on the optimal output, wherein the schedule comprises a time series for base station controller software upgrades.

2. The method of claim 1, wherein the schedule further comprises a time series for base station controller additions.

3. The method of claim 1, wherein the schedule further comprises a time series for base transceiver station re-homing and load balancing.

4. The method of claim 1, wherein the schedule further comprises a time series for base transceiver station to a base station controller assignment.

5. The method of claim 1, wherein the schedule further comprises a report for triggering base station subsystem network related activities.

6. The method of claim 1, wherein the plurality of penalty factors further comprises a third penalty factor associated with handover traffic.

7. The method of claim 1, wherein the plurality of penalty factors further comprises a third penalty factor associated with load balancing.

8. The method of claim 1, wherein each penalty factor of the plurality of penalty factors has a weight factor that differentiates a relative importance of each penalty factor as compared to other penalty factors of the plurality of penalty factors, wherein the weight factor is modified by a user.

9. The method of claim 1, wherein each penalty factor of the plurality of penalty factors has a weight factor that differentiates a relative importance of each penalty factor as compared to other penalty factors of the plurality of penalty factors, wherein the weight factor is modified using a slider scale.

10. The method of claim 9, wherein the slider scale has a value set between a value of zero and a value of one.

11. The method of claim 1, wherein the plurality of penalty factors further comprises a third penalty factor associated with handover traffic, a fourth penalty factor associated with load balancing, and a fifth penalty factor associated with a budgetary limitation.

12. The method of claim 1, wherein the input data comprises a busy hour demand forecast.

13. The method of claim 1, wherein the input data comprises a user preference.

14. A non-transitory computer-readable medium storing a plurality of instructions which, when executed by a processor, cause the processor to perform operations for providing planning of a plurality of base station controllers in a wireless network, the operations comprising:
   obtaining input data;
   determining a limit for a base station controller parameter in accordance with the input data;
   determining when the limit for the base station controller parameter is exceeded;
   determining after the limit for the base station controller parameter is exceeded, an optimal output for an objective function, wherein the objective function is based on a plurality of penalty factors, wherein the plurality of penalty factors comprises a first penalty factor associated with base transceiver station re-homing and a second penalty factor associated with geographical clustering, wherein the first penalty factor is distinct from the second penalty factor; and
   providing a schedule based on the optimal output, wherein the schedule comprises a time series for base station controller software upgrades.

15. The non-transitory computer-readable medium of claim 14,
   wherein the schedule further comprises a time series for base station controller additions.

16. An apparatus for providing planning of a plurality of base station controllers in a wireless network, the apparatus comprising:
   a processor; and
   a computer-readable medium storing a plurality of instructions which, when executed by the processor, cause the processor to perform operations, the operations comprising:
   obtaining input data;
   determining a limit for a base station controller parameter in accordance with the input data;
   determining when the limit for the base station controller parameter is exceeded;
   determining after the limit for the base station controller parameter is exceeded, an optimal output for an objective function, wherein the objective function is based on a plurality of penalty factors, wherein the plurality of penalty factors comprises a first penalty factor associated with base transceiver station re-homing and a second penalty factor associated with geographical clustering, wherein the first penalty factor is distinct from the second penalty factor; and
   providing a schedule based on the optimal output, wherein the schedule comprises a time series for base station controller software upgrades.

17. The apparatus of claim 16,
   wherein the schedule further comprises a time series for base station controller additions.

18. The apparatus of claim 16, wherein the schedule further comprises a time series for base transceiver station re-homing and load balancing.

19. The apparatus of claim 16, wherein the schedule further comprises a time series for base transceiver station to a base station controller assignment.

20. The apparatus of claim 16, wherein the schedule further comprises a report for triggering base station subsystem network related activities.

\* \* \* \* \*